July 14, 1970  C. D. DOCKERY  3,520,010
PARISON SEVERING MEANS HAVING BLADE WITH SHARP
EDGE AND OFFSET TOP SURFACE
Filed Feb. 20, 1967
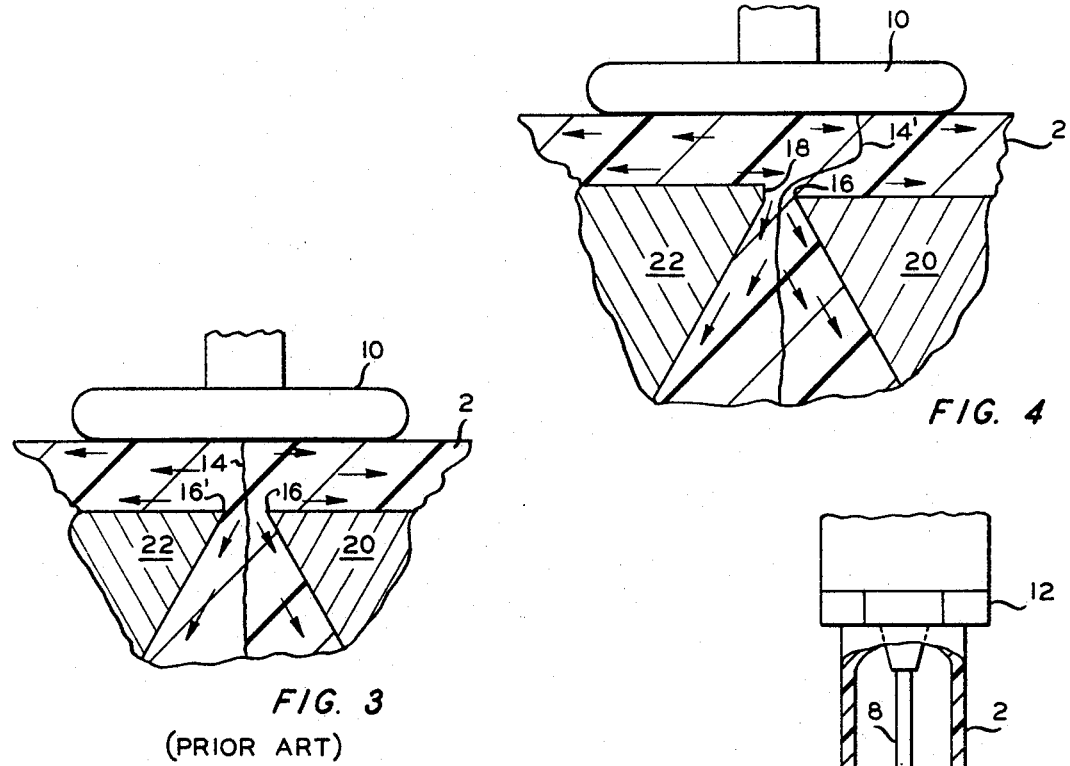
FIG. 4
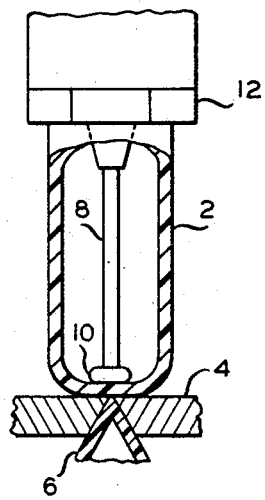
FIG. 2
FIG. 3
(PRIOR ART)
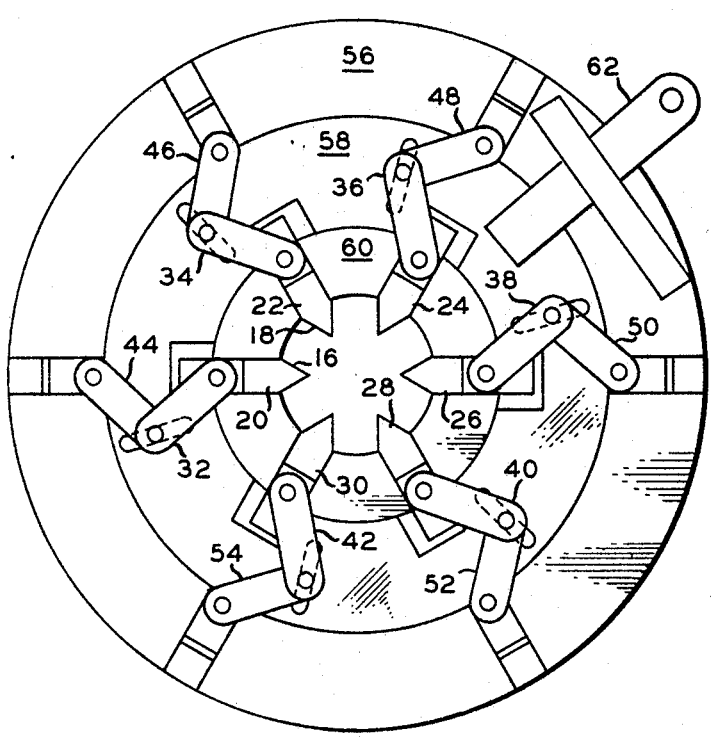
FIG. 1
INVENTOR.
C. D. DOCKERY
BY Young & Quigg
ATTORNEYS United States Patent Office 3,520,010
Patented July 14, 1970

3,520,010
PARISON SEVERING MEANS HAVING BLADE WITH SHARP EDGE AND OFFSET TOP SURFACE
Calvin D. Dockery, Bartlesville, Okla., assignor to Phillips Petroleum Company, a corporation of Delaware
Filed Feb. 20, 1967, Ser. No. 617,404
Int. Cl. B29c 17/07; B29d 23/03
U.S. Cl. 18—5                                                                 2 Claims

ABSTRACT OF THE DISCLOSURE

Pinching off and sealing thermoplastic parisons using at least a pair of blades, one of which blades has an anvil or flat surface, against which the parison is severed, and the other blade having a sharp edge.

---

This invention relates to the pinching off and sealing of a thermoplastic parison. One of its aspects relates to a method of pinching off and sealing a thermoplastic parison wherein the thermoplastic material in the pinch off area flows across the sealed area during the severing operation and thereby seals the parison. In another of its aspects, the invention relates to an apparatus for pinching off and sealing a tubular thermoplastic parison in which apparatus a pointed cutting blade and an anvil blade coact to provide an improved seal in the pinch off area of the parison.

In a copending application, Ser. No. 489,934, now U.S. 3,390,426 filed Sept. 24, 1965, there is disclosed and claimed a method and apparatus for molding hollow articles. One aspect of the apparatus and method disclosed and claimed in said application is that a heated thermoplastic parison is pinched off and sealed at the pinch off area using a plurality of jaws which came together toward a point. This seal is improved with the use of a pressure foot within the parison which bears against the thermoplastic material in the area of the pinch off during the pinching off operation and shortly thereafter. In this apparatus, all the blades in the jaws come together toward a point and meet when the jaws are closed.

By various aspects of this invention, one or more of the following or other objects can be obtained.

It is an object of this invention to provide apparatus for pinching off and sealing thermoplastic parisons.

It is a further object of this invention to provide apparatus for pinching off tubular parisons wherein an improved seal in the pinch off area is obtained.

It is a still further object of this invention to provide an apparatus for providing an improved seal in a pinch off area of a thermoplastic parison wherein the apparatus is operated satisfactorily for longer times with less critical adjustment and is less expensive to make.

Other aspects, objects, and the several advantages of this invention are apparent to one skilled in the art from a study of this disclosure, the drawings, and the appended claims.

The invention provides an improvement over a pinch off device for thermoplastic parisons. The parison, preferably heated to a temperature at which the bringing together of the parison surfaces will cause a parison to seal in that area, is placed between a plurality of blades. Preferably, the blades pinch the parison in towards a point to form a central area while a pressure foot inside the parison presses the parison in the pinch off area against the blades to aid in forming the seal.

According to the invention, every other blade surface contains a flat anvil surface which abuts against an opposing sharp edged blade surface. In this manner, the thermoplastic material in the seal area is caused to flow across a fusion plane, i.e. that area directly above the closing blades, to thereby provide an improved seal.

In the method according to the invention a heated thermoplastic parison is sealed and pinched off by squeezing the same together from at least two sides, while flowing thermoplastic material across the initial fusion plane resulting from bringing each side of the parison together. Preferably, pressure is applied to the seal area from within the parison to facilitate flowing and sealing of the thermoplastic material.

The invention will now be described with reference to the accompanying drawing in which FIG. 1 is a plan view of a suitable pinch off device which can be used according to the invention; FIG. 2 is an elevational view partly in section of a closed pinch off device as it is pinching off a thermoplastic parison; FIG. 3 is an expanded view of the sealed area shown in FIG. 2 wherein conventional or prior art blades are used and the parison has been sealed and pressed but not pinched off; and FIG. 4 is a view similar to FIG. 3 showing a pair of blades according to the invention.

Referring now to the drawings and to FIG. 1 in particular, a plurality of jaws 20, 22, 24, 26, 28 and 30 are attached reciprocably to ring 60 which is stationary. Linkages 32, 34, 36, 38, 40 and 42 are rotatably attached at one end to jaws 20, 22, 24, 26, 28 and 30, respectively, and at the other end to plate 58 and to rotatable linkages 44, 46, 48, 50, 52 and 54, respectively. The last mentioned linkages are rotatably attached to plate 56. Plate 58 is rotatable about the central area and is actuated to rotate by lever 62. The rotation back and forth of plate 58 causes jaws 20, 22, 24, 26, 28 and 30 to reciprocate toward and away from the central area. A parison to be pinched off is placed in the central area and is accordingly pinched off and sealed by the action of jaws 20, 22, 24, 26, 28 and 30 moving together in the central area towards a point.

The seal in the pinch off area is further improved by the use of a pressure foot shown in FIG. 2. The pressure foot 10 is attached to rod 8 and bears against the thermoplastic parison 2 as the same is pinched off by the pinch off device 4. After the jaws come to a point in the central area and the parison is pinched off, the pressure foot 8 remains in contact with the parison in the sealed area for a short period of time to insure a good seal. The parison 2 is held in place by suitable gripping device 12. The excess parison 6 which has been pinched off then either falls away or can be removed from the pinch off device 4.

Referring now to FIG. 3 wherein the conventional or prior art pinch off blades are shown, blades 20 and 22 contain a sharp edge 16 and 16', respectively, which come together to part the parison along fusion plane 14. The action of pressure foot 10 on the top of the thermoplastic material causes the material to flow outwardly away from parting line 14. Although the parison will seal in this area, the seal is the weakest area of the bottom of the parison.

Referring now to FIG. 4, where like numerals have been used to designate like parts, jaws 20 and 22 come together to pinch off the parison. However, in this case, blade 20 contains a knife or sharp edge 16 while jaw 22 contains a relatively flat surface 18 which the sharp edge 16 abuts. Additionally, the top of jaw 20 is offset downwardly slightly with relation to the top surface of jaw 22. With this combination of elements and with the pressure foot 10 bearing down on the thermoplastic material, the plastic material is flowed across the fusion plane 14' so that it is pushed off to the side. In this manner, an improved seal in the pinch off area is obtained.

In carrying out the invention, the thermoplastic parisons which are sealed and pinched off are heated thermoplastic parisons normally used in a blow molding operation. These thermoplastic parisons can be made from polymers and copolymers of ethylene, propylene, butene-1 styrene and chlorinated vinyl containing monomers.

In carrying out the invention, the pressure foot will generally apply a pressure in excess of 1000 p.s.i. to the seal area, preferably about 1300 p.s.i.

While the invention has been described with reference to a 6-way pinch off, it is obvious that any number of jaws could be used in carrying out the invention. For example, that as few as 2 jaws or 3 jaws, or as many as 10 can be employed depending on the type of seal desired.

It is to be emphasized that the anvil-like flat surface 18 is much easier to construct and maintain than is blade edge 16. Further the use of the flat surface 18 requires much less precise alignment and adjustment than would two blade edges like 16.

Reasonable variations and modifications are possible within the scope of the foregoing disclosure without departing from the spirit thereof.

I claim:
1. An apparatus for sealing and pinching off a thermoplastic parison comprising:
    at least two jaw members adapted to move toward tnd away from each other with said parison between said jaw members, said jaw members having at least one blade, said blades being characterized along the area where said blades come together by
    one of said jaw blades having a sharp edge,
    the other of said jaw blades having a flat surface opposing said sharp blade surface such that when sealing and pinching off said parisons, said sharp edge abuts against said flat surface,
    a top surface of said jaw blade containing said sharp edge being slightly offset below a top surface of said other jaw blade, and
    means movable in a direction perpendicular to the direction of movement of said jaw members to apply pressure from within said parison.

2. An apparatus according to claim 1 wherein there are six jaw members which pinch off said parison toward a point.

References Cited
UNITED STATES PATENTS
| | | | |
|---|---|---|---|
| 2,516,552 | 7/1950 | Clark et al. | 264—96 X |
| 3,052,916 | 9/1962 | Campbell | 264—97 |
| 3,291,670 | 12/1966 | Usab. | |
| 3,390,462 | 7/1968 | Turner et al. | |

FOREIGN PATENTS
943,573   12/1963   Great Britain.

ROBERT F. WHITE, Primary Examiner

T. J. CARVIS, Assistant Examiner

U.S. Cl. X.R.

264—94, 98